United States Patent
Chang et al.

(10) Patent No.: US 9,004,234 B2
(45) Date of Patent: Apr. 14, 2015

(54) BRAKE DISTRIBUTION STRUCTURE

(71) Applicant: Paul Hsu Senior High School, Guishan Township, Taoyuan County (TW)

(72) Inventors: Chen-Hua Chang, Guishan Township, Taoyuan County (TW); Wen-Yi Huang, Guishan Township, Taoyuan County (TW); Chih-Po Wu, Guishan Township, Taoyuan County (TW); Fu-Yu You, Guishan Township, Taoyuan County (TW); Wen-Hsien Lin, Guishan Township, Taoyuan County (TW)

(73) Assignee: Paul Hsu Senior High School, Taoyuan County (TW)

( * ) Notice: Subject to any disclaimer, the term of this patent is extended or adjusted under 35 U.S.C. 154(b) by 0 days.

(21) Appl. No.: 14/152,691

(22) Filed: Jan. 10, 2014

(65) Prior Publication Data
US 2014/0202802 A1 Jul. 24, 2014

(30) Foreign Application Priority Data

Jan. 18, 2013 (TW) .............................. 102201198 U
Dec. 17, 2013 (TW) .............................. 102223819 U

(51) Int. Cl.
*B62L 3/02* (2006.01)
*B62L 3/08* (2006.01)
*B60T 11/06* (2006.01)

(52) U.S. Cl.
CPC . *B62L 3/08* (2013.01); *B60T 11/06* (2013.01); *B62L 3/02* (2013.01)

(58) Field of Classification Search
USPC ................ 188/24.14–24.16, 24.22; 74/501.6, 74/500.5, 501.5 R
See application file for complete search history.

(56) References Cited

U.S. PATENT DOCUMENTS

| | | | | |
|---|---|---|---|---|
| 4,823,915 | A * | 4/1989 | Nagano ......................... | 188/2 D |
| 5,927,442 | A * | 7/1999 | Liao ........................... | 188/24.16 |
| 6,098,486 | A * | 8/2000 | Liao ............................ | 74/500.5 |
| 8,469,156 | B2 * | 6/2013 | Lu et al. ..................... | 188/24.22 |

* cited by examiner

*Primary Examiner* — Christopher Schwartz
(74) *Attorney, Agent, or Firm* — Juan Carlos A. Marquez; Bacon & Thomas PLLC

(57) ABSTRACT

Provided is a brake distribution structure including a first sliding block, a second sliding block, and a tube. The first sliding block connects to a rear brake line of a bicycle. The second sliding block connects to a front brake line of the bicycle. The first sliding block moves to brake a rear wheel of the bicycle, and then the first sliding block drives the second sliding block to move and thereby brake the front wheel of the bicycle. The brake distribution structure ensures that the rear wheel is always braked first, prevents brake lockup, reduces hazards otherwise arising from manmade false action, and maximizes rider safety.

12 Claims, 20 Drawing Sheets

BRAKE DISTRIBUTION STRUCTURE

BACKGROUND OF THE INVENTION

1. Technical Field

The present invention relates to brake distribution structures, and more particularly, to a brake distribution structure for braking the rear wheel and then the front wheel of a bicycle.

2. Description of Related Art

With people becoming more sport-conscious and health-conscious, bicycling is an important sport to plenty of people nowadays. Riders of sport bicycles, road bicycles, recreational bicycles, and utility bicycles are increasing rapidly.

The wide use of bicycles in sports and transport is inevitably accompanied by accidents and even, in severe accidents, loss of lives and properties. Accidents which involve bicycle riders are covered by newspapers and magazines at times.

In general, conventional bicycle manufacturing technologies and extrinsic improvements thereon are focused mostly on raw materials, bicycle weight, drag ratio, riding comfort, additional alert lights, and satellite positioning tracking searching. By contrast, researchers seldom plan seriously the R&D of a brake system highly correlated with safety and foolproof design thereof (automatic prevention of manmade false action), put forth simple effective solutions, or publish innovative inventions.

Accordingly, it is imperative to develop and devise a bicycle brake structure which not only responds instantly to whatever braking operations performed by a bicycle rider but also turns the rider's incorrect operations into correct operations automatically so as to ensure rider safety and fun.

SUMMARY OF THE INVENTION

The present invention provides a brake distribution structure comprising a first sliding block, a second sliding block, and a tube. The brake distribution structure is characterized by driving the first sliding block to brake the rear wheel of a bicycle and then driving the second sliding block by the first sliding block to brake the front wheel of the bicycle so as to direct whatever braking operations toward the rear wheel first and thus greatly reduce the hazards which might otherwise be caused by manmade false action, wherein the first sliding block uses a buffer unit to prevent a brake from being locked, thereby ensuring the highest degree of rider security.

The present invention provides a brake distribution structure which comprises: a first sliding block having a first top surface, a first bottom surface, a first sliding surface, a first lateral surface, at least a manual brake connecting portion, a first connecting portion, and at least a driving bump rising from the first sliding surface; a second sliding block having a second top surface, a second bottom surface, a second sliding surface, a second lateral surface, and at least a driving slot having a second connecting portion and exposed from the second sliding surface, wherein the second sliding surface is in slidable contact with the first sliding surface, and the driving slot is of a larger length than the driving bump; and a tube for receiving the first sliding block and the second sliding block in a manner to allow the first sliding block and the second sliding block to slide within the tube, wherein two ends of the tube have a first covering surface and a second covering surface, respectively, and at least an opening is disposed on each of the first covering surface and the second covering surface, wherein the driving slot is coupled to the driving bump in a one-to-one relationship, such that displacement of the driving bump drives the second sliding block to move.

Implementation of the present invention at least involves the following inventive steps:

1. Control the duration of operation of front and rear wheel braking efficiently.
2. Always brake the rear wheel first to preclude manmade false action which may otherwise end up in braking the front wheel, such that riders are less likely to get injured, thereby ensuring rider safety.
3. Prevent brake lockup efficiently and thus enhance rider safety.

The features and advantages of the present invention are detailed hereinafter with reference to the preferred embodiments. The detailed description is intended to enable a person skilled in the art to gain insight into the technical contents disclosed herein and implement the present invention accordingly. In particular, a person skilled in the art can easily understand the objects and advantages of the present invention by referring to the disclosure of the specification, the claims, and the accompanying drawings.

BRIEF DESCRIPTION OF THE SEVERAL VIEWS OF THE DRAWINGS

The invention as well as a preferred mode of use, further objectives and advantages thereof will be best understood by reference to the following detailed description of illustrative embodiments when read in conjunction with the accompanying drawings, wherein.

DETAILED DESCRIPTION OF THE EMBODIMENT OF THE INVENTION

Figure 1:
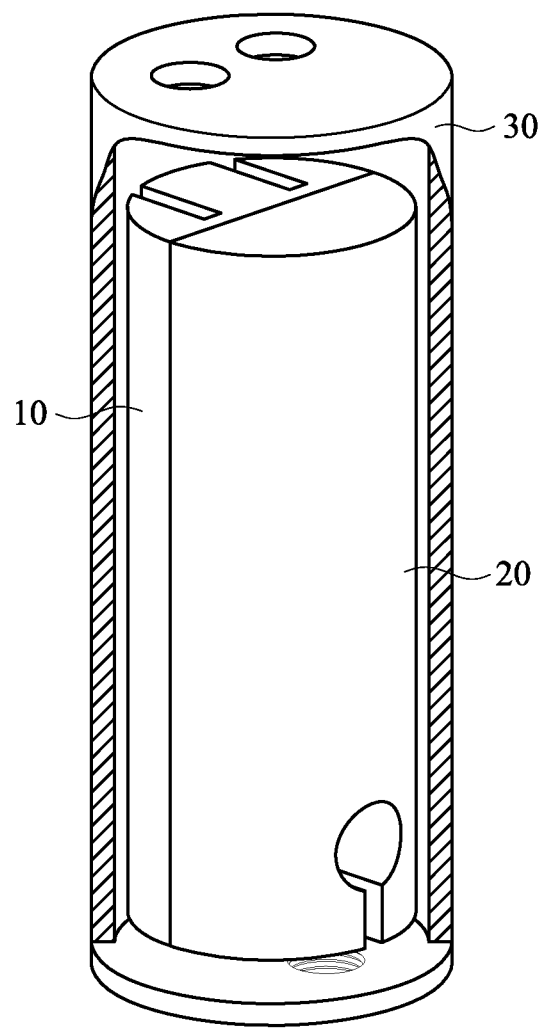
FIG. 1 is a perspective view of a brake distribution structure according to an embodiment of the present invention.

Referring to FIG. 1, there is shown a brake distribution structure 100, which comprises a first sliding block 10, a second sliding block 20, and a tube 30, according to an embodiment of the present invention.

Figure 2A:
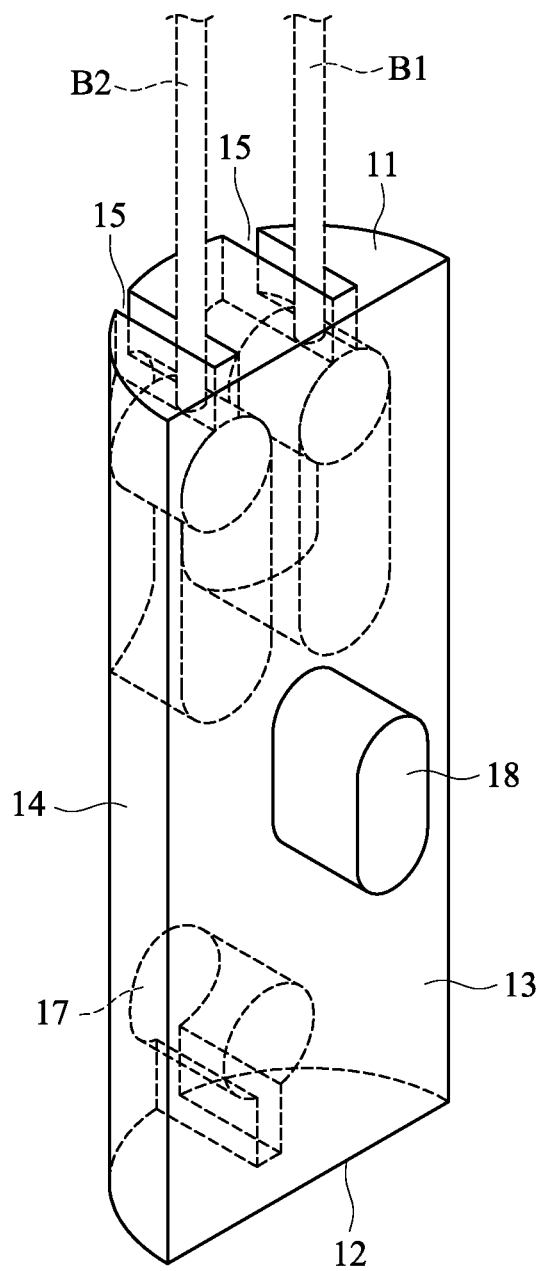
FIG. 2A is a perspective view of a first sliding block according to an embodiment of the present invention.
Figure 2B:
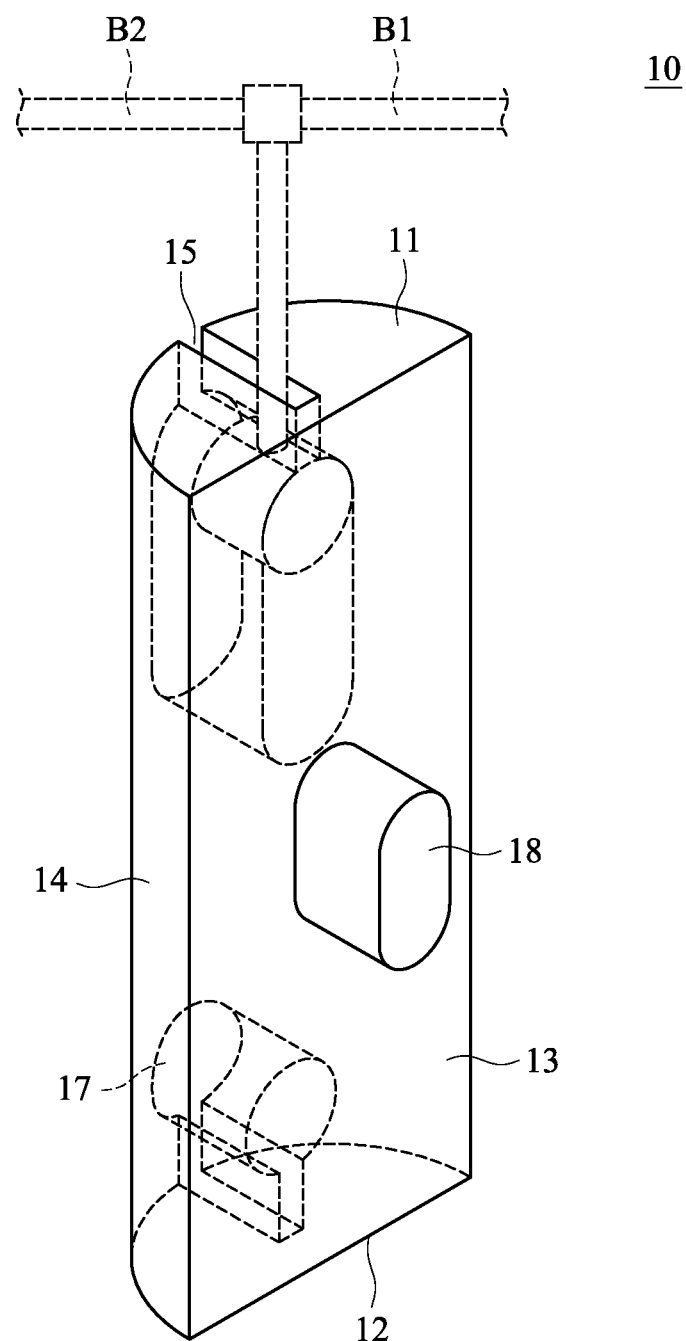
FIG. 2B is a perspective view of another first sliding block according to an embodiment of the present invention.

Referring to FIG. 1, FIG. 2A and FIG. 2B, the first sliding block 10 is a hemicylinder. The first sliding block 10 is made of an aluminum alloy, an aluminum magnesium alloy, or any other lightweight rigid material.

Referring to FIG. 2A and FIG. 2B, the first sliding block 10 has a first top surface 11, a first bottom surface 12, a first sliding surface 13 and a first lateral surface 14. The first bottom surface 12 is opposite the first top surface 11. The first sliding surface 13 is defined as a plane which adjoins the first top surface 11 and the first bottom surface 12. The first lateral surface 14 is opposite the first sliding surface 13. The first sliding block 10 has at least a manual brake connecting portion 15, a first connecting portion 17, and at least a driving bump 18.

The at least a manual brake connecting portion 15 is a slot which is exposed from the first top surface 11 and the first lateral surface 14. The first connecting portion 17 is a slot which is exposed from the first bottom surface 12 and the first lateral surface 14. The first connecting portion 17 is not in contact with the at least a manual brake connecting portion 15. The at least a driving bump 18 rises from the first sliding surface 13.

The at least a manual brake connecting portion 15 is in the number of one or two. When the at least a manual brake connecting portion 15 is in the number of one, left handle brake line B1 and right handle brake line B2 meet before connect to the at least a manual brake connecting portion 15. When the at least a manual brake connecting portion 15 is in the number of two, left handle brake line B1 and right handle brake line B2 connect to their respective manual brake connecting portions 15.

Hence, as soon as the bicycle rider uses the left brake handle or the right brake handle to perform a brake, left handle brake line B1 or right handle brake line B2 drives the first sliding block 10 to move. The embodiments described below are exemplified by two said manual brake connecting portions 15.

Figure 2C:
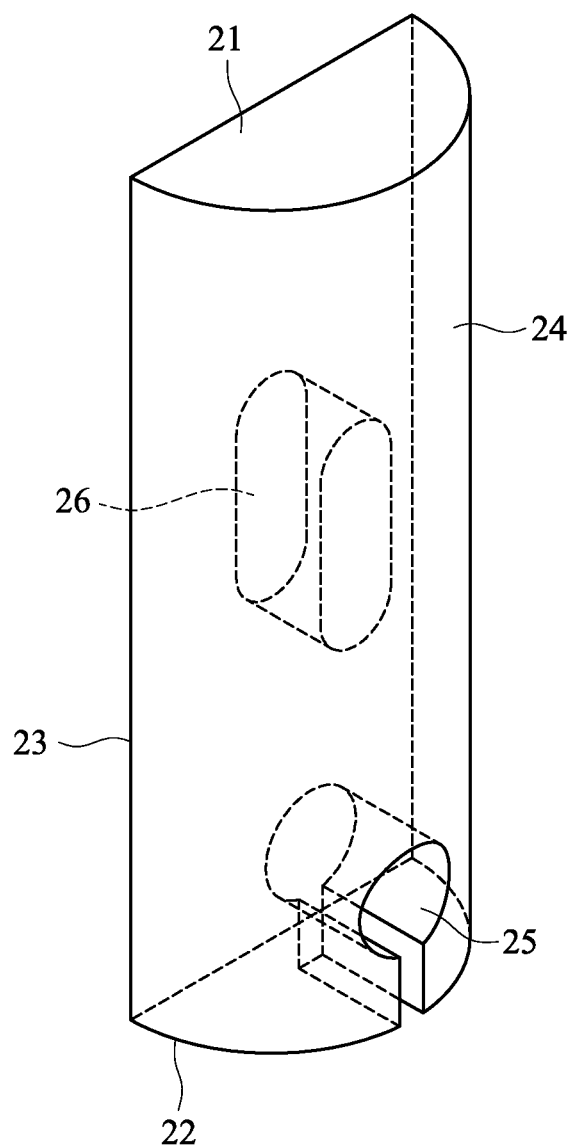
FIG. 2C is a perspective view of a second sliding block according to an embodiment of the present invention.

Referring to FIG. 1 and FIG. 2C, the second sliding block 20 is a hemicylinder. The second sliding block 20 is made of an aluminum alloy, an aluminum magnesium alloy, or any other lightweight rigid material.

Referring to FIG. 2C, the second sliding block 20 has a second top surface 21, a second bottom surface 22, a second sliding surface 23, and a second lateral surface 24. The second bottom surface 22 is opposite the second top surface 21. The second sliding surface 23 is defined as a plane which adjoins the second top surface 21 and the second bottom surface 22. The second lateral surface 24 is opposite the second sliding surface 23. The second sliding block 20 has a second connecting portion 25 and at least a driving slot 26.

Referring to FIG. 2A through FIG. 2C, the second connecting portion 25 is a slot which is exposed from the second bottom surface 22 and the second lateral surface 24. The driving slot 26 is another slot exposed from the second sliding surface 23, extended in the direction of the second lateral surface 24, and adapted to receive the at least a driving bump 18 of the first sliding block 10.

Figure 3:
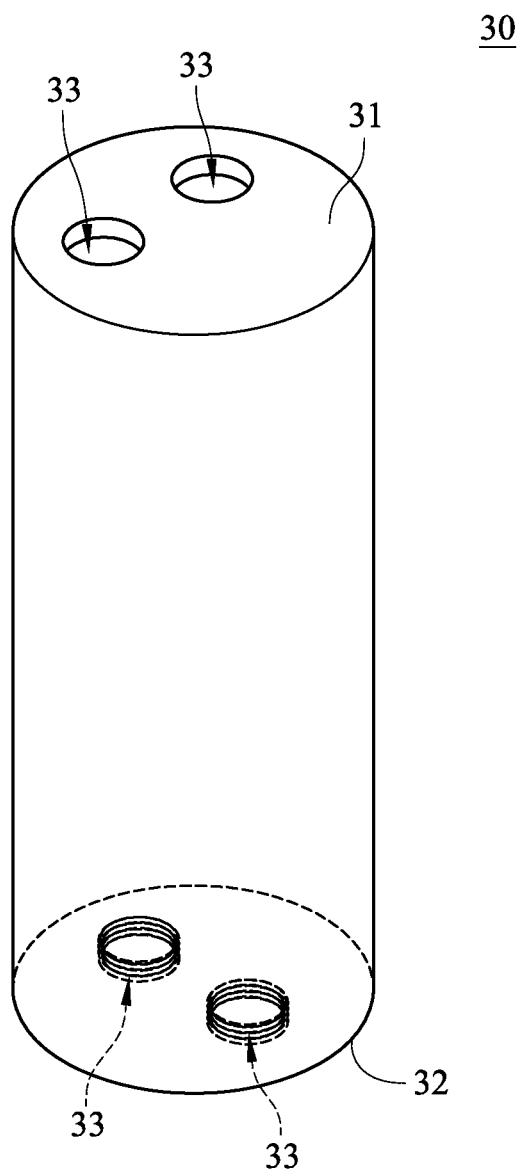
FIG. 3 is a perspective view of a tube according to an embodiment of the present invention.

Referring to FIG. 1 and FIG. 3, the tube 30 receives the first sliding block 10 and the second sliding block 20 in a manner to allow the first sliding block 10 and the second sliding block 20 to slide while being confined to the tube 30. The two ends of the tube 30 have a first covering surface 31 and a second covering surface 32, respectively. The first covering surface 31 and the second covering surface 32 have at least an opening 33 each. Brake lines of the bicycle penetrate the at least an opening 33 to enter the tube 30.

Figure 4A:
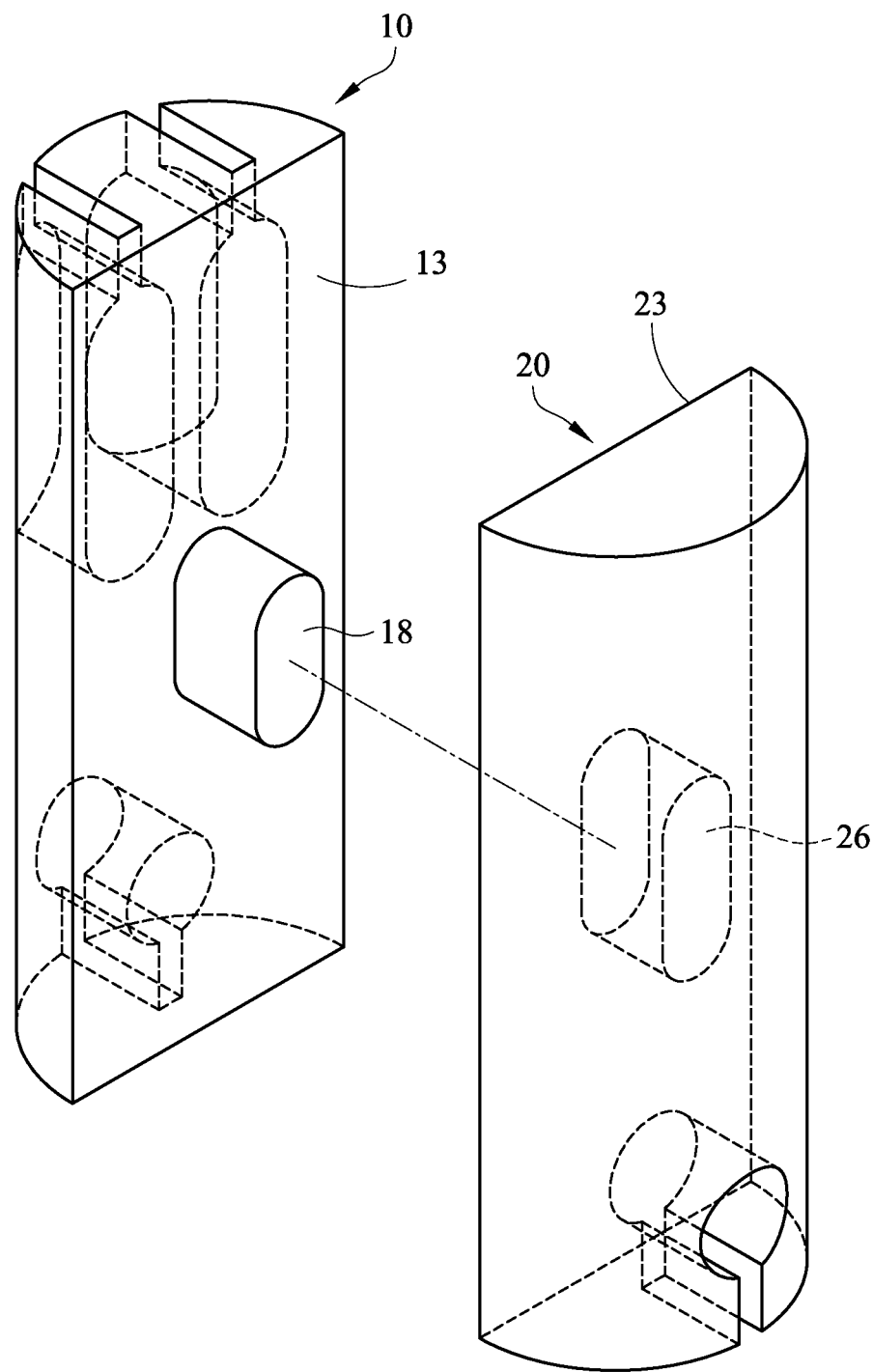
FIG. 4A is a perspective view of a first sliding block and the second sliding block before put together according to an embodiment of the present invention.
Figure 4B:
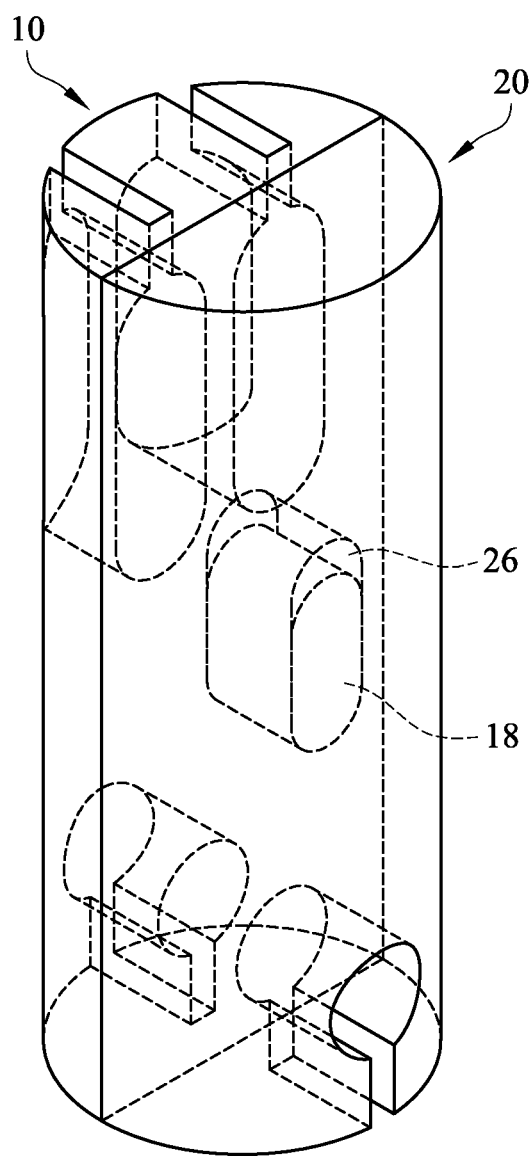
FIG. 4B is a perspective view of a first sliding block and the second sliding block after put together according to an embodiment of the present invention.

Referring to FIG. 4A and FIG. 4B, the second sliding block 20 is slidably coupled to the first sliding block 10 as the second sliding surface 23 of the second sliding block 20 is in slidable contact with the first sliding surface 13 of the first sliding block 10, such that the driving slot 26 of the second sliding block 20 is coupled to the at least a driving bump 18 of the first sliding block 10 in a one-to-one relationship. Hence, as soon as the first sliding block 10 is pulled, the at least a driving bump 18 coupled to the driving slot 26 undergoes displacement and causes the second sliding block 20 to move.

Figure 5A:
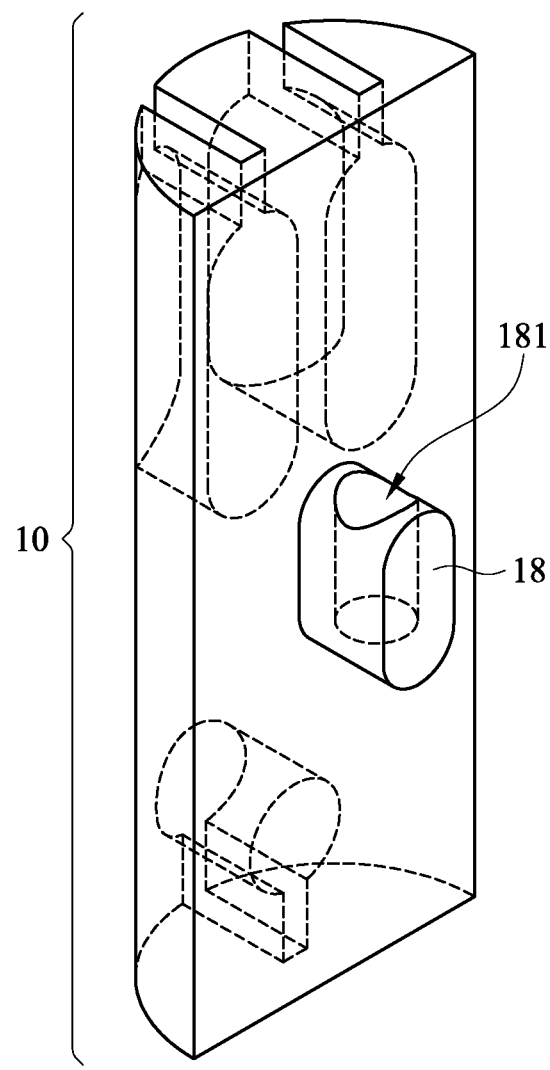
FIG. 5A is a schematic perspective view of a first sliding block with a receiving recess according to an embodiment of the present invention.
Figure 5B:
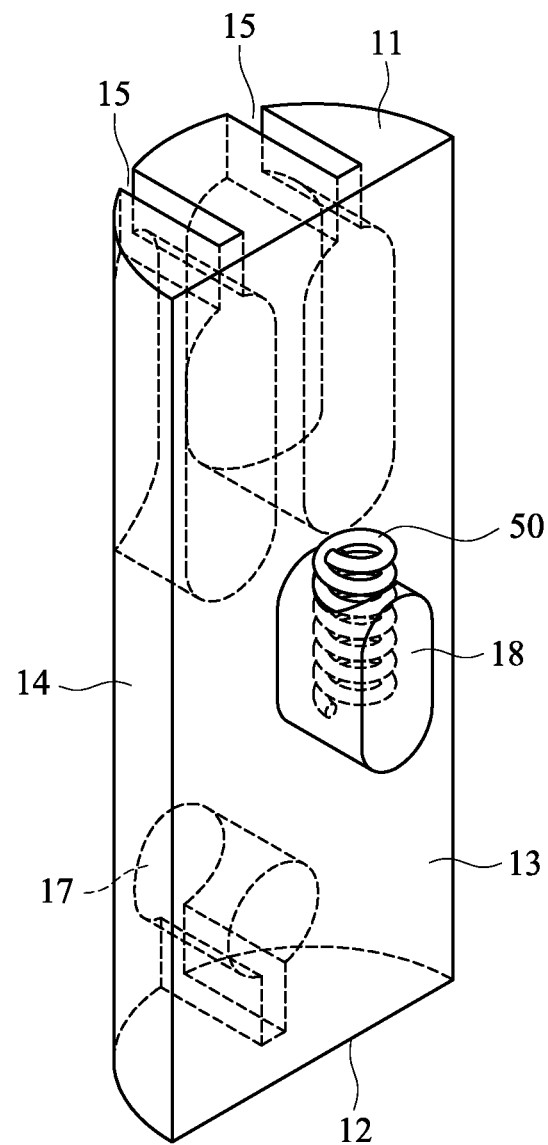
FIG. 5B is a schematic perspective view of a first sliding block with a receiving recess and a buffer unit according to an embodiment of the present invention.

Referring to FIG. 5A and FIG. 5B, a receiving recess 181 is disposed at the at least a driving bump 18 of the first sliding block 10 in a manner to face the first top surface 11. The receiving recess 181 receives a buffer unit 50. The buffer unit 50 is a spring.

Figure 6:
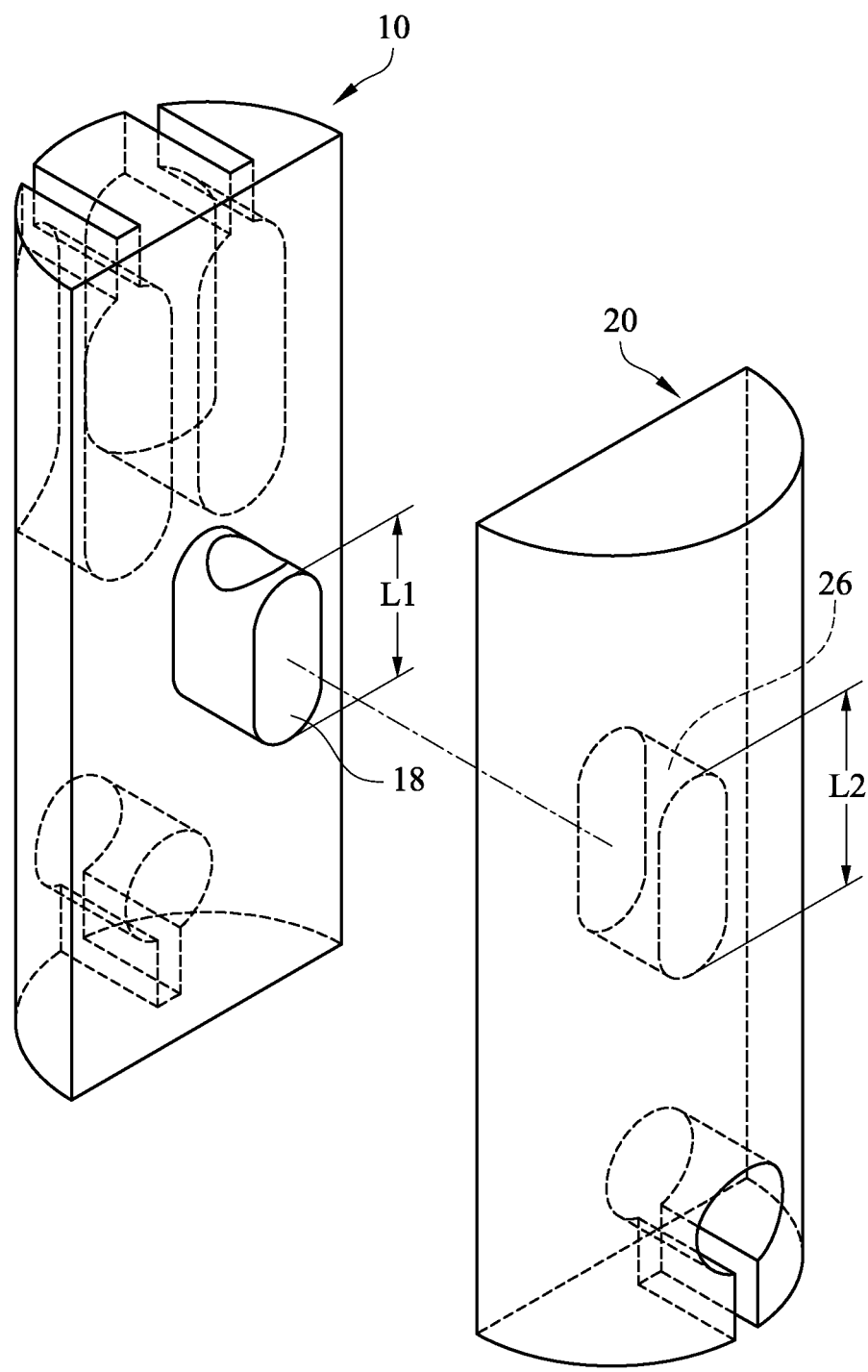
FIG. 6 is a schematic perspective view of the lengths of a driving bump and a driving slot according to an embodiment of the present invention.

Referring to FIG. 6, the length of the at least a driving bump 18 in the lengthwise direction is defined as a first length L1, whereas the length of the driving slot 26 in the lengthwise direction is defined as a second length L2. The second length L2 is larger than the first length L1, such that the at least a driving bump 18 can be received in the driving slot 26. The width of the at least a driving bump 18 equals the width of the driving slot 26 substantially, such that the at least a driving bump 18 is unlikely to sway sideward while sliding within the driving slot 26.

Referring to FIG. 5B through FIG. 7A, when the receiving recess 181 of the at least a driving bump 18 receives the buffer unit 50, a portion of the buffer unit 50 protrudes from the at least a driving bump 18. The sum of the length of the protruding portion of the buffer unit 50 and the first length L1 must not be larger than the second length L2, such that the at least a driving bump 18 receiving the buffer unit 50 can be put in the driving slot 26 even when the buffer unit 50 is uncompressed.

Referring to FIG. 7A through FIG. 7D, there are shown schematic perspective views of the brake distribution structure 100 connected to a bicycle brake system according to an embodiment of the present invention. As shown in the diagrams, left handle brake line B1 connects the left brake handle of the bicycle and the at least a manual brake connecting portion 15 of the brake distribution structure 100, right handle brake line B2 connects the right brake handle of the bicycle and the at least a manual brake connecting portion 15, rear wheel brake line B3 connects a rear wheel brake of the bicycle and the first connecting portion 17, and front wheel brake line B4 connects the front wheel brake of the bicycle and the second connecting portion 25.

Figure 7A:
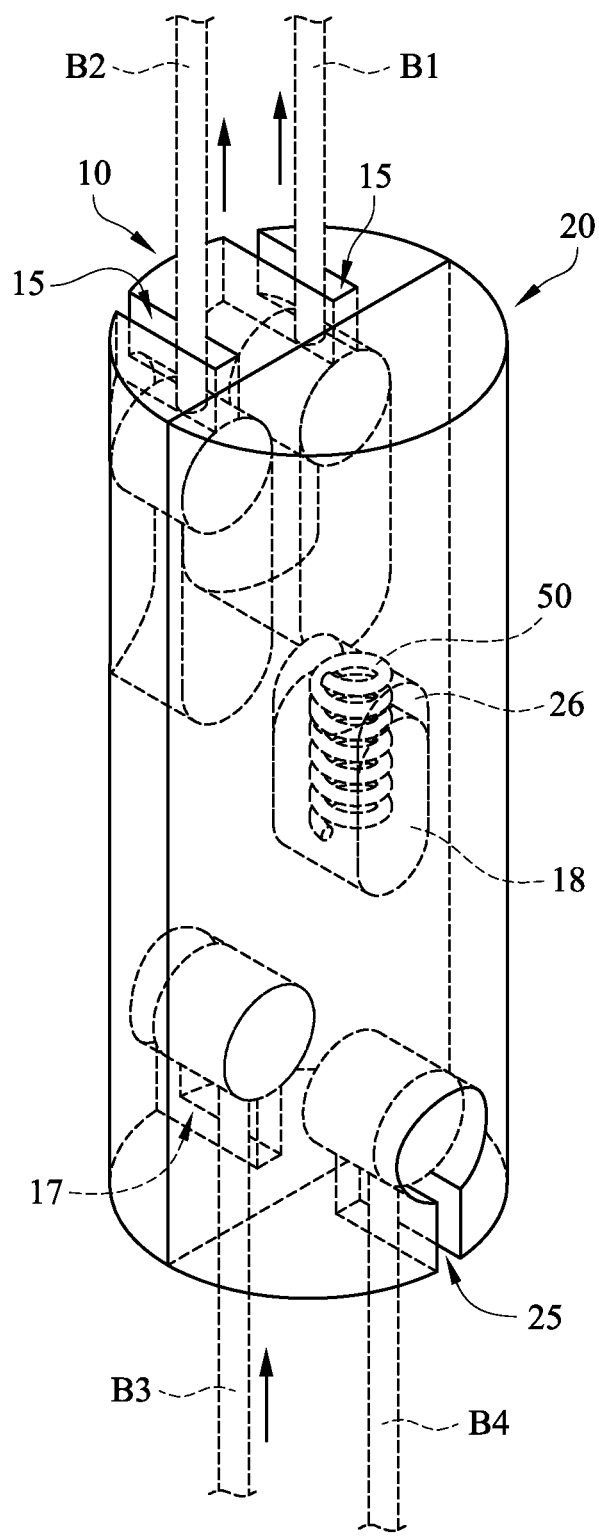
FIG. 7A is a schematic perspective view of a rear wheel brake line being moved first according to an embodiment of the present invention.
Figure 7B:
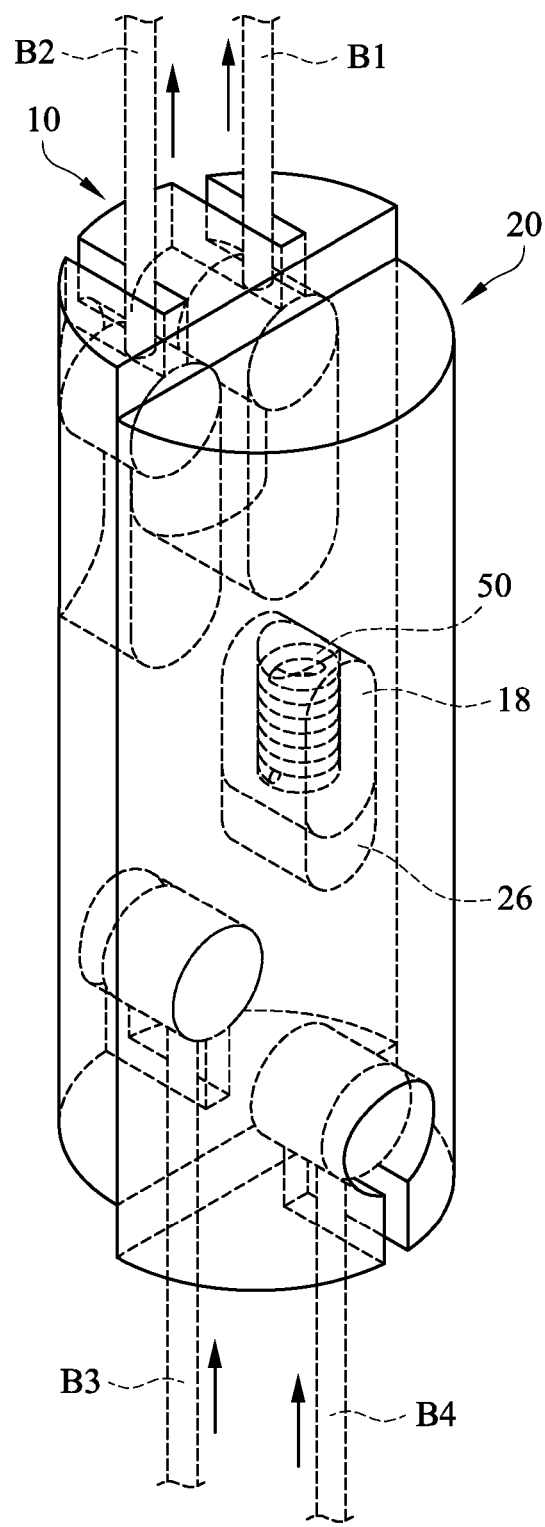
FIG. 7B is a schematic perspective view of a front wheel brake line being moved according to an embodiment of the present invention.
Figure 7C:
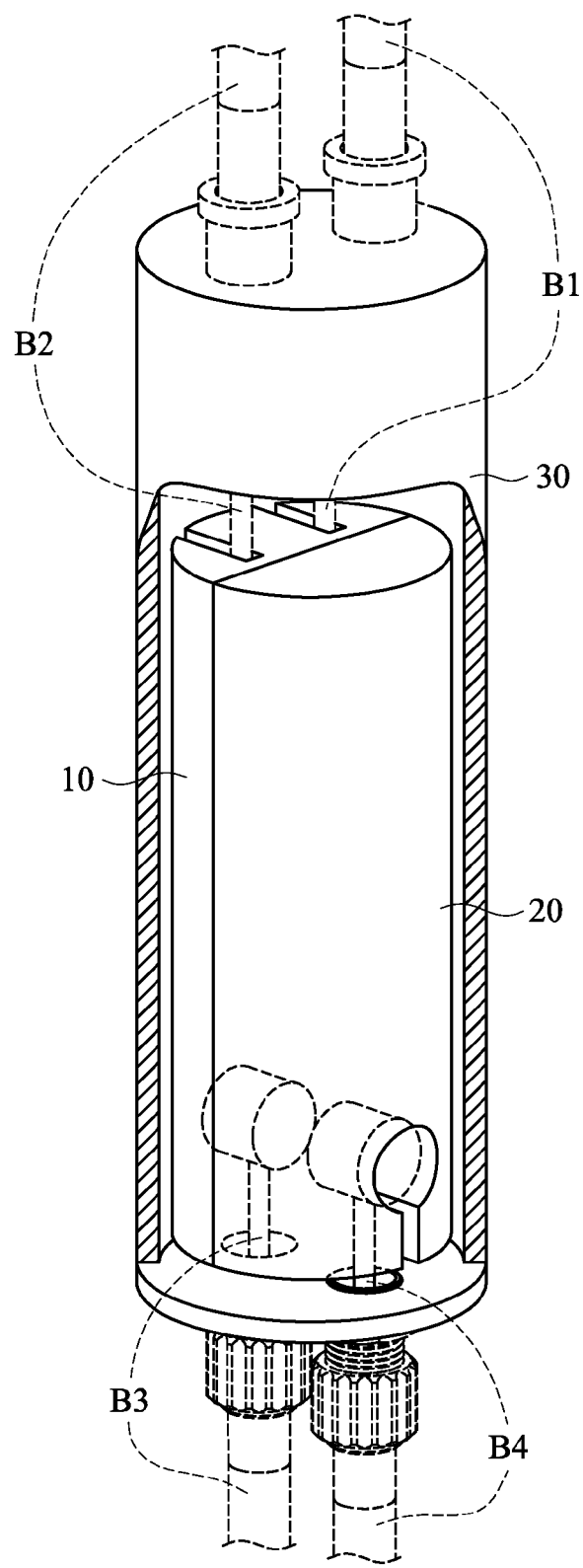
FIG. 7C is a schematic perspective view of the brake distribution structure coupled to brake lines according to an embodiment of the present invention.
Figure 7D:
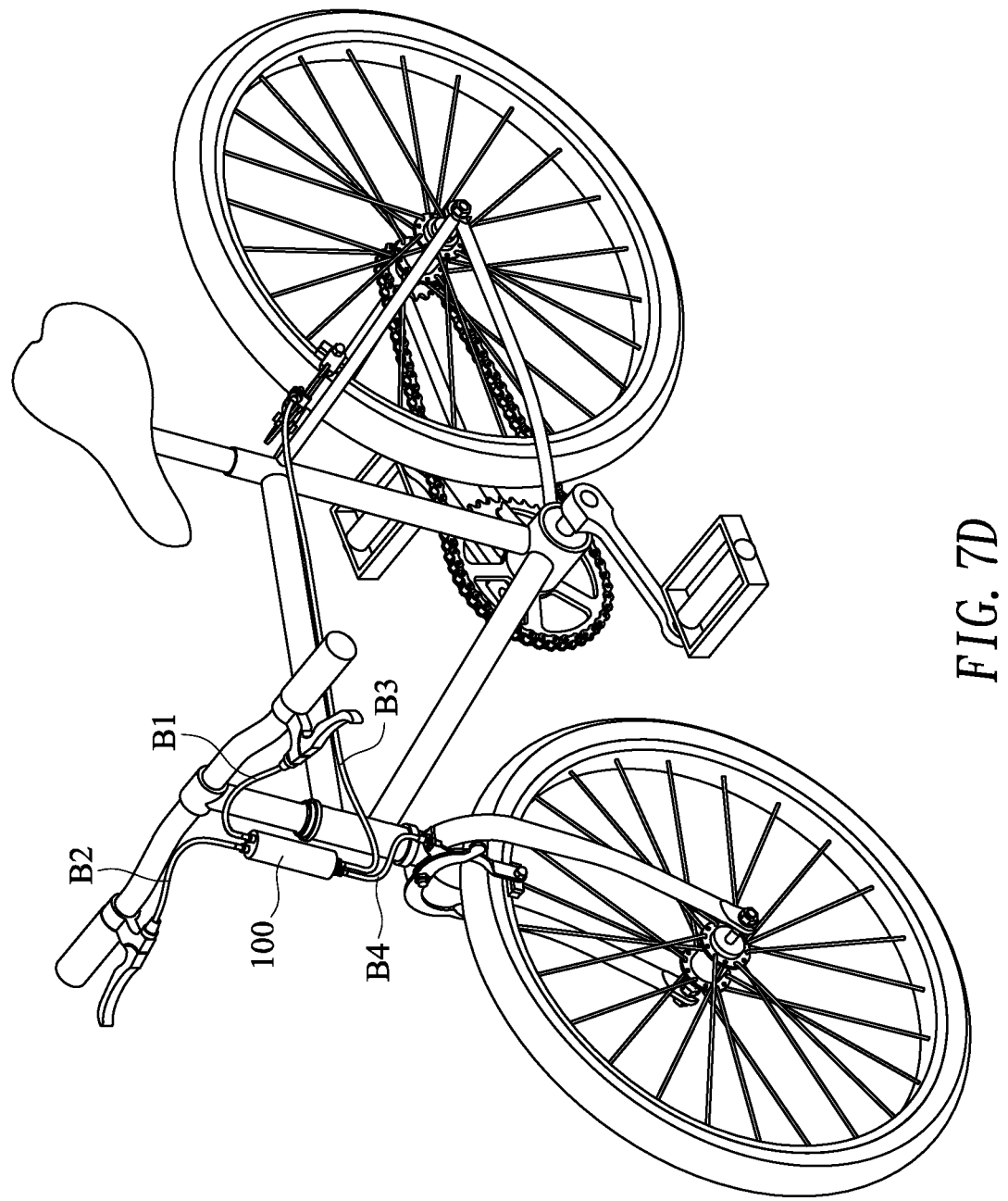
FIG. 7D is a schematic perspective view of the brake distribution structure coupled to a bicycle according to an embodiment of the present invention.

Referring to FIG. 7A and FIG. 7D, when pulled, left handle brake line B1 or right handle brake line B2 drives the first sliding block 10 to move first, such that the first sliding block 10 drives rear wheel brake line B3 to move and thus begins braking the rear wheel of the bicycle; meanwhile, the at least a driving bump 18 begins to slide within the driving slot 26, and the buffer unit 50 of the at least a driving bump 18 has not yet been compressed.

Referring to FIG. 7A, with the buffer unit 50 being resilient, as soon as the first sliding block 10 begins to drive rear wheel brake line B3 to move, the buffer unit 50 produces a buffering effect to thereby prevent the first sliding block 10 from instantly stretching rear wheel brake line B3 tightly, prevent brake lockup, and enhance bicycle riding safety.

Referring to FIG. 7B and FIG. 7D, left handle brake line B1 or right handle brake line B2 continues to operate, not only causing the at least a driving bump 18 and the buffer unit 50 to slide to the edge of the driving slot 26, but also causing the buffer unit 50 to be compressed and retracted into the receiving recess 181. At this point in time, the at least a driving bump 18 in the driving slot 26 stops sliding but begins to pull the second sliding block 20; as a result, the second sliding block 20 moves and pulls front wheel brake line B4 connected to the second connecting portion 25, thereby braking the front wheel of the bicycle.

Referring to FIG. 7A, FIG. 7B and FIG. 7D, the brake distribution structure 100 ensures that the rear wheel of the bicycle is braked first, regardless of whether the rider presses left brake handle or right brake handle of the bicycle, and thus precludes any manmade false action which might otherwise end up in braking the front wheel of the bicycle and thus injuring the rider. Furthermore, the brake distribution structure 100 performs a buffering function for preventing brake lockup and then brakes the front wheel of the bicycle to thereby enhance bicycle riding safety. Furthermore, even if the buffer unit 50 is absent, the brake distribution structure 100 can still perform the aforesaid operation to brake the rear wheel first and then brake the front wheel and thus precludes any manmade false action which might otherwise end up in braking the front wheel of the bicycle and thus injuring the rider.

Furthermore, to render it easy for the first sliding block 10 to drive the second sliding block 20, it is necessary that the first sliding block 10 is heavier than the second sliding block 20. If the first sliding block 10 and the second sliding block 20 are made of the same material, it will be feasible for the first sliding block 10 to be of a larger volume than the second sliding block 20.

Figure 8:
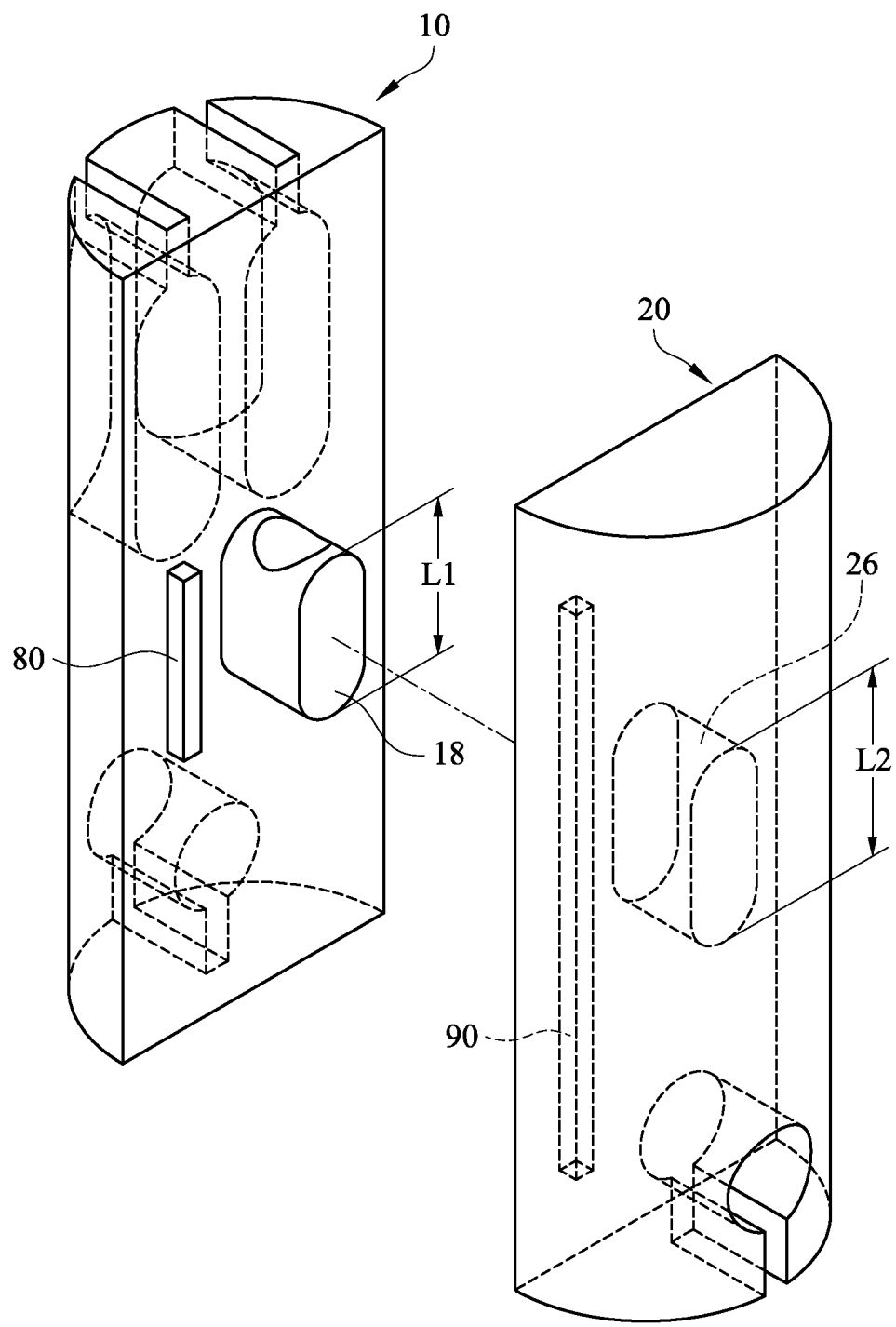
FIG. 8 is a schematic perspective view of the first sliding block and the second sliding block which have a rail and a groove, respectively, according to an embodiment of the present invention.

Referring to FIG. 8, it is important that a slide process which takes place between the first sliding block 10 and the second sliding block 20 is smooth and free from shift; to this end, at least a rail 80 and at least a groove 90 corresponding in position thereto are disposed between the first sliding surface 13 and the second sliding surface 23.

Figure 9A:
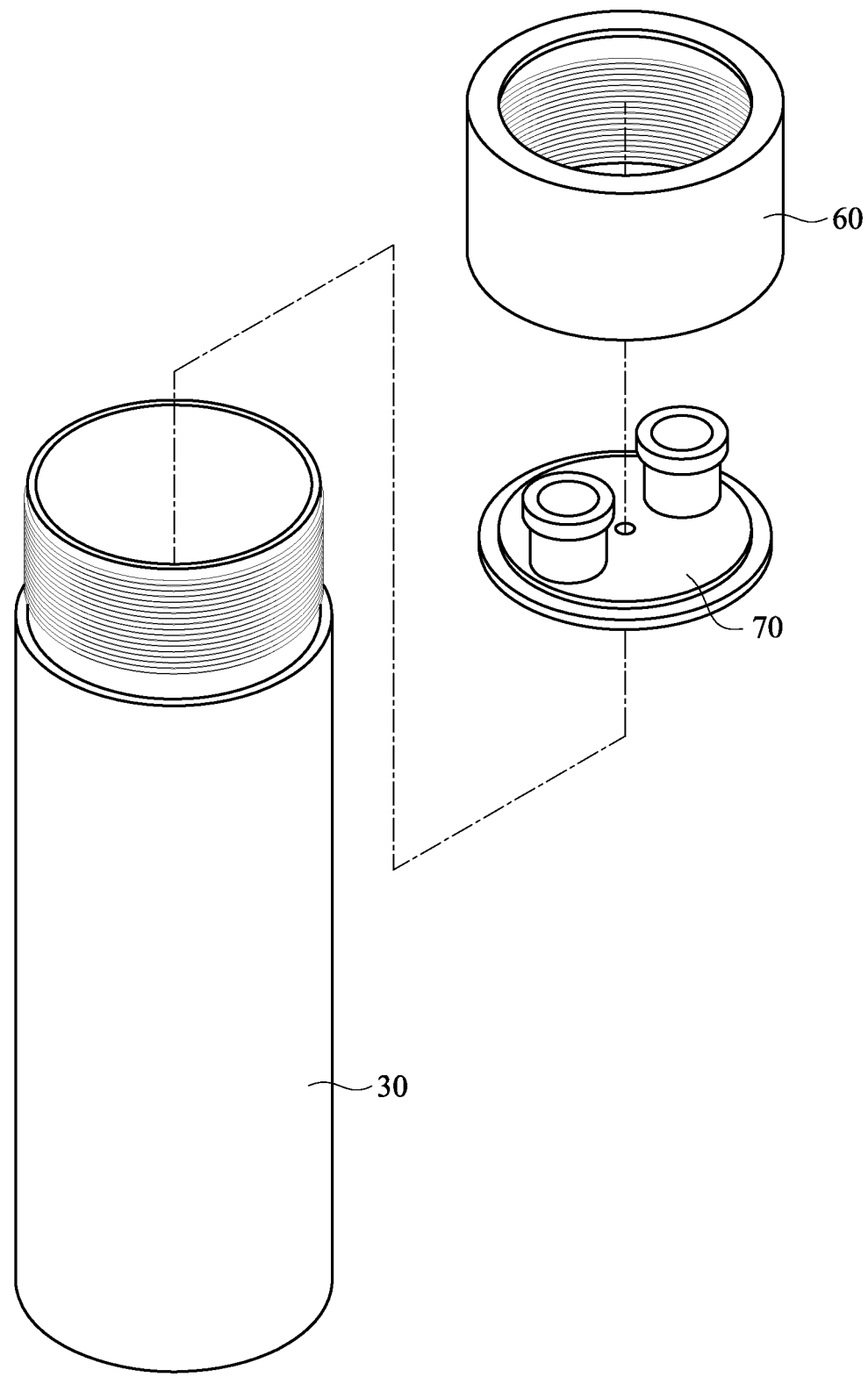
FIG. 9A is a perspective view of a tube, a movable guider and a covering body before put together according to an embodiment of the present invention.
Figure 9B:
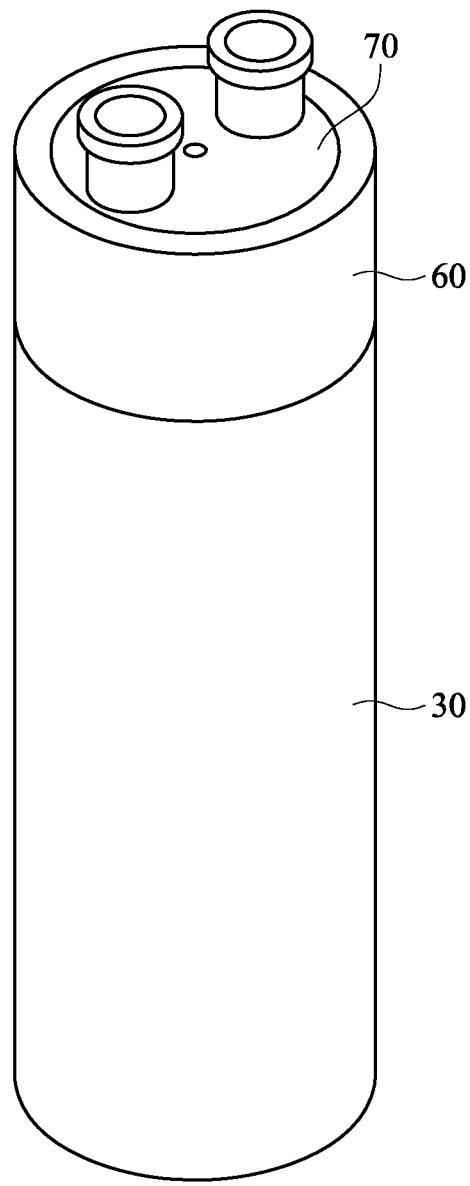
FIG. 9B is a perspective view of the tube, the movable guider and the covering body after put together according to an embodiment of the present invention.

Referring to FIG. 9A and FIG. 9B, the first covering surface 31 of the tube 30 is a covering body 60, such that the covering body 60 and the tube 30 are coupled together by means of threads. Furthermore, a movable guider 70 is disposed between the covering body 60 and the tube 30. The movable guider 70 comprises at least an aperture. The required quantity of the at least an aperture depends on the quantity of brake lines. If the brake lines admitted into the tube 30 are in the number of two, each said brake line penetrates an aperture, such that the movable guider 70 effectively separates the positions of the brake lines to therefore prevent the brake lines from entangling with each other to the detriment of the performance of the brake distribution structure 100.

The covering body 60 has a through-hole. The movable guider 70 is exposed from the through-hole. The movable guider 70 is not only rotatable freely between the covering body 60 and the tube 30, but also conceals the tube 30 so as to prevent intrusion of dust, water, sand, rocks or foreign bodies into the tube 30.

Figure 9C:
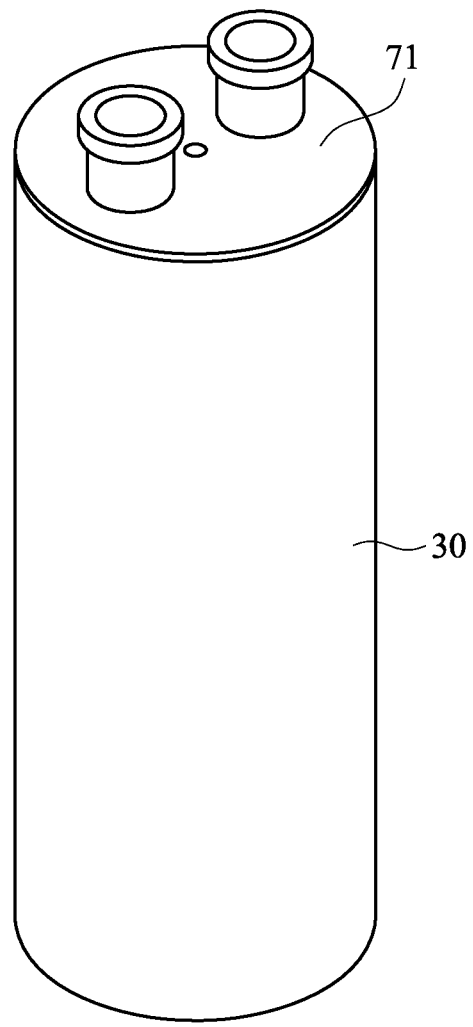
FIG. 9C is a perspective view of the tube and a stationary guider coupled thereto according to an embodiment of the present invention.

Referring to FIG. 9C, a stationary guider 71 substitutes for the covering body 60 and the movable guider 70. The stationary guider 71 is coupled to at least an opening of the tube 30 and adapted to conceal the tube 30 and prevent intrusion of dust, water, sand, rocks or foreign bodies into the tube 30. Likewise, the stationary guider 71 comprises at least an aperture for separating the positions of the brake lines.

Figure 10A:
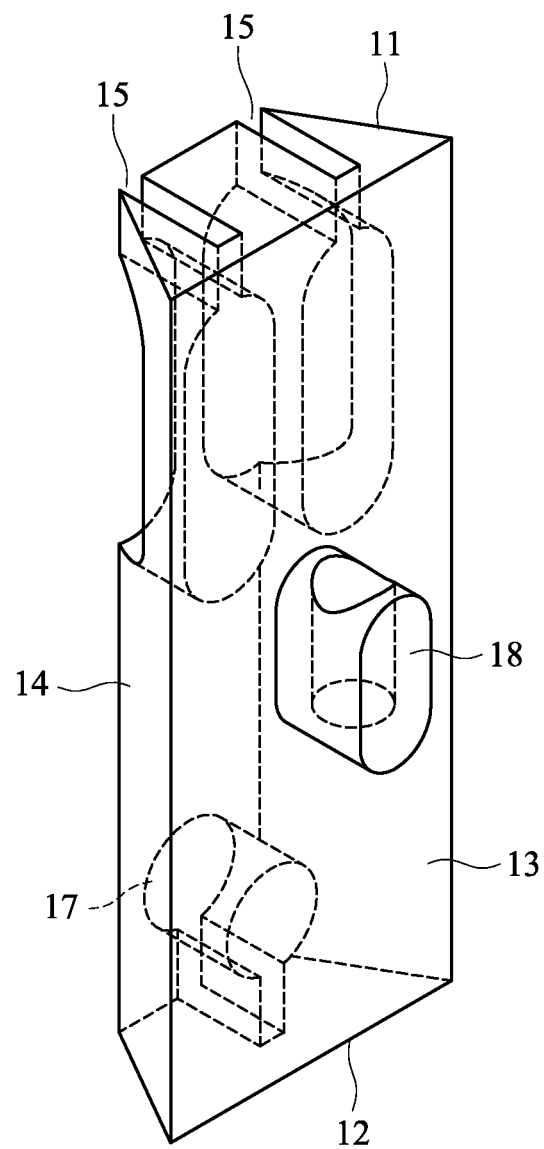
FIG. 10A is a perspective view of another first sliding block according to an embodiment of the present invention.
Figure 10B:
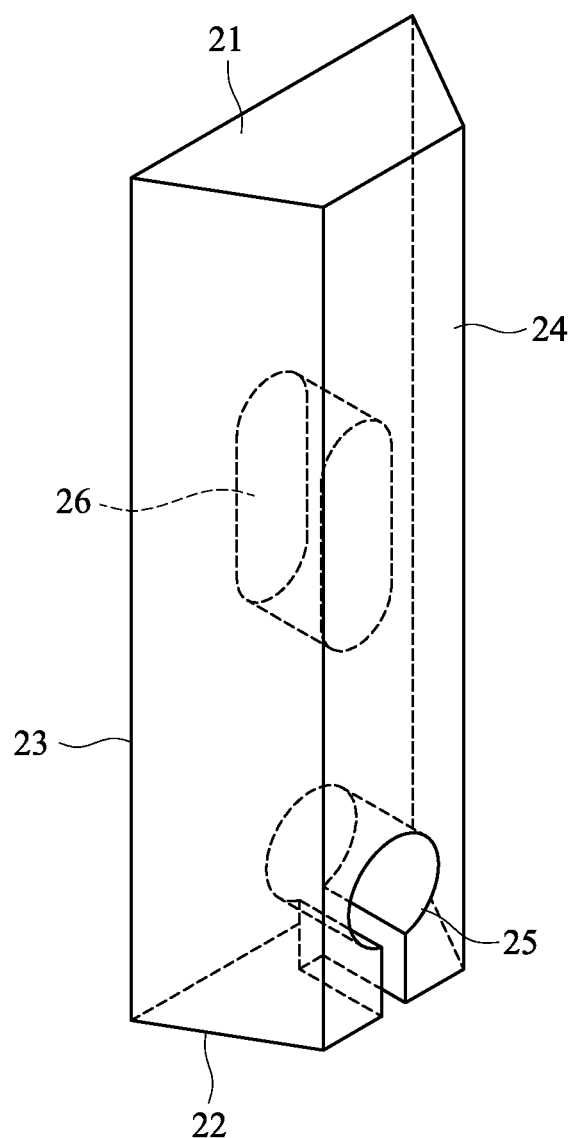
FIG. 10B is a perspective view of another second sliding block according to an embodiment of the present invention.

Referring to FIG. 2A and FIG. 10A, the embodiments of the present invention are not restrictive of the shape of the first sliding block 10, and the first sliding block 10 is a hemicylinder or a polygonal cylinder as needed. Likewise, referring to FIG. 2B and FIG. 10B, the embodiments of the present invention are not restrictive of the shape of the second sliding block 20, and the second sliding block 20 is a hemicylinder or a polygonal cylinder as needed. The first sliding block 10 and the second sliding block 20 can be slidably coupled together regardless of the shape of the first sliding block 10 and the second sliding block 20, as the second sliding surface 23 of the second sliding block 20 and the first sliding surface 13 of the first sliding block 10 are in slidable contact with each other.

The embodiments described above are intended only to demonstrate the technical concept and features of the present invention so as to enable a person skilled in the art to understand and implement the contents disclosed herein. It is understood that the disclosed embodiments are not to limit the scope of the present invention. Therefore, all equivalent changes or modifications based on the concept of the present invention should be encompassed by the appended claims.

What is claimed is:

1. A brake distribution structure, comprising:
   a first sliding block having a first top surface, a first bottom surface, a first sliding surface, a first lateral surface, at least a manual brake connecting portion, a first connecting portion, and at least a driving bump rising from the first sliding surface;
   a second sliding block having a second top surface, a second bottom surface, a second sliding surface, a second lateral surface, a second connecting portion, and at least a driving slot exposed from the second sliding surface, wherein the second sliding surface is in slidable contact with the first sliding surface, and the driving slot is of a larger length than the driving bump; and
   a tube for receiving the first sliding block and the second sliding block in a manner to allow the first sliding block and the second sliding block to slide within the tube, wherein two ends of the tube have a first covering surface and a second covering surface, respectively, and at least an opening is disposed on each of the first covering surface and the second covering surface,
   wherein the driving slot is coupled to the driving bump in a one-to-one relationship, such that displacement of the driving bump drives the second sliding block to move.

2. The brake distribution structure of claim 1, wherein the manual brake connecting portion is a slot exposed from the first top surface and the first lateral surface.

3. The brake distribution structure of claim 1, wherein the first connecting portion is a slot exposed from the first bottom surface and the first lateral surface, and the first connecting portion is not in contact with the manual brake connecting portion.

4. The brake distribution structure of claim 1, wherein the second connecting portion is a slot exposed from the second bottom surface and the second lateral surface.

5. The brake distribution structure of claim 1, wherein the driving bump has a receiving recess for fixing therein a buffer unit in place.

6. The brake distribution structure of claim 1, wherein the first covering surface is a covering body coupled to the tube by means of threads.

7. The brake distribution structure of claim 6, wherein a movable guider is disposed between the tube and the covering body.

8. The brake distribution structure of claim 1, wherein the first covering surface is a stationary guider.

9. The brake distribution structure of claim 1, wherein at least a rail and at least a groove are disposed between the first sliding surface and the second sliding surface.

10. The brake distribution structure of claim 1, wherein the first sliding block is heavier than the second sliding block.

11. The brake distribution structure of claim 1, wherein the first sliding block is one of a hemicylinder and a polygonal cylinder.

12. The brake distribution structure of claim 1, wherein the second sliding block is one of a hemicylinder and a polygonal cylinder.

* * * * *